(12) United States Patent
Dronamraju et al.

(10) Patent No.: US 11,592,986 B2
(45) Date of Patent: Feb. 28, 2023

(54) METHODS FOR MINIMIZING FRAGMENTATION IN SSD WITHIN A STORAGE SYSTEM AND DEVICES THEREOF

(71) Applicant: NetApp Inc., San Jose, CA (US)

(72) Inventors: Ravikanth Dronamraju, Pleasanton, CA (US); Shivali Gupta, Bangalore (IN); Kyle Sterling, San Francisco, CA (US); Atul Goel, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/486,160

(22) Filed: Sep. 27, 2021

(65) Prior Publication Data

US 2022/0083232 A1 Mar. 17, 2022

Related U.S. Application Data

(63) Continuation of application No. 16/584,025, filed on Sep. 26, 2019, now Pat. No. 11,132,129, which is a continuation of application No. 15/195,093, filed on Jun. 28, 2016, now Pat. No. 10,430,081.

(51) Int. Cl.
*G06F 3/06* (2006.01)
*G06F 12/02* (2006.01)
*G06F 12/0868* (2016.01)

(52) U.S. Cl.
CPC ............ *G06F 3/0608* (2013.01); *G06F 3/064* (2013.01); *G06F 3/0631* (2013.01); *G06F 3/0679* (2013.01); *G06F 12/0246* (2013.01); *G06F 12/0868* (2013.01); *G06F 2212/1044* (2013.01);

(Continued)

(58) Field of Classification Search
CPC .... G06F 3/06; G06F 12/0246; G06F 12/0868; G06F 2212/1044; G06F 2212/214; G06F 2212/281

See application file for complete search history.

(56) References Cited

U.S. PATENT DOCUMENTS

| 6,418,510 B1 * | 7/2002 | Lamberts | G06F 3/0656 711/E12.07 |
| 2007/0214309 A1 * | 9/2007 | Matsuura | G06F 12/0246 711/170 |
| 2008/0250195 A1 | 10/2008 | Chow et al. | |

(Continued)

OTHER PUBLICATIONS

Oh, Yongseok, et al. "Caching less for better performance: balancing cache size and update cost of flash memory cache in hybrid storage systems." FAST. vol. 12. 2012. (Year: 2012).*

(Continued)

*Primary Examiner* — Khoa D Doan
(74) *Attorney, Agent, or Firm* — Cooper Legal Group, LLC

(57) ABSTRACT

A method, non-transitory computer readable medium, and device that assists with reducing memory fragmentation in solid state devices includes identifying an allocation area within an address range to write data from a cache. Next, the identified allocation area is determined for including previously stored data. The previously stored data is read from the identified allocation area when it is determined that the identified allocation area comprises previously stored data. Next, both the write data from the cache and the read previously stored data are written back into the identified allocation area sequentially through the address range.

20 Claims, 3 Drawing Sheets

(52) U.S. Cl.
CPC .. *G06F 2212/214* (2013.01); *G06F 2212/281* (2013.01)

(56) References Cited

U.S. PATENT DOCUMENTS

| | | |
|---|---|---|
| 2011/0099326 A1 | 4/2011 | Jung et al. |
| 2013/0019057 A1* | 1/2013 | Stephens ............... G06F 3/0688 |
| | | 711/E12.008 |
| 2014/0173178 A1 | 6/2014 | Schwartz |
| 2015/0106410 A1 | 4/2015 | Zaltsman et al. |
| 2016/0085674 A1 | 3/2016 | Sterns et al. |
| 2016/0274792 A1 | 9/2016 | Ogawa et al. |
| 2016/0371035 A1 | 12/2016 | Hayasaka et al. |
| 2017/0031994 A1 | 2/2017 | Patterson, III et al. |

OTHER PUBLICATIONS

Int. Search Report/Written Opinion cited in the International Application No. PCT/US036680 dated Jun. 9, 2017, 10 pgs.

"Smart Data Management—Atonomous Disk De-fragmentation", Sep. 2014, ip.com, an IP.com Prior Art Database Technical Disclosure 3 pgs.

"Heuristic User Behavior Based Hard Disk Defragmentation Mechanism", 2010, Varun Mittal and Chinmay Sharma, UKSim Fourth European Modeling Symposium on Computer Modeling and Simulation, pp. 43-45.

\* cited by examiner

METHODS FOR MINIMIZING FRAGMENTATION IN SSD WITHIN A STORAGE SYSTEM AND DEVICES THEREOF

FIELD

This application claims priority to and is a continuation of U.S. application Ser. No. 16/584,025, filed Sep. 26, 2019, now allowed, and titled "METHODS FOR MINIMIZING FRAGMENTATION IN SSD WITHIN A STORAGE SYSTEM AND DEVICES THEREOF," which claims priority to and is a continuation of U.S. Pat. No. 10,430,081, filed Jun. 28, 2016, and titled "METHODS FOR MINIMIZING FRAGMENTATION IN SSD WITHIN A STORAGE SYSTEM AND DEVICES THEREOF," which is incorporated herein by reference.

This technology generally relates to data storage management and, more particularly, methods for minimizing fragmentation in solid state devices (SSD) within a storage system and devices thereof.

BACKGROUND

Repeated writing data sets to, and erasing data sets from, a data storage medium causes storage space to be used inefficiently and this phenomenon is called fragmentation within the data storage medium. Fragmentation within the data storage mediums phenomenon reduces storage capacity, and increases access and read times. Fragmentation occurs when a computing device does not allocate enough contiguous storage space to encode a complete data set as a single sequence, and instead divides the data set into portions which are encoded in gaps between other data sets. Typically, these data storage medium gaps arise because an earlier data set was deleted, or excess space was allocated to another stored data set. The degree to which a data storage medium is fragmented heavily dependent upon the size and number of data sets stored on it.

To address the fragmentation issue, prior technologies uses the technique of defragmentation where the datasets written to a data storage medium is rearranged such that segments of each data set are written contiguously. Unfortunately, the technique used in the prior technologies fails to significantly reduce fragmentation and are time consuming, memory intensive operations that can significantly reduce the performance of a computer system while being executed.

DETAILED DESCRIPTION

Figure 1:
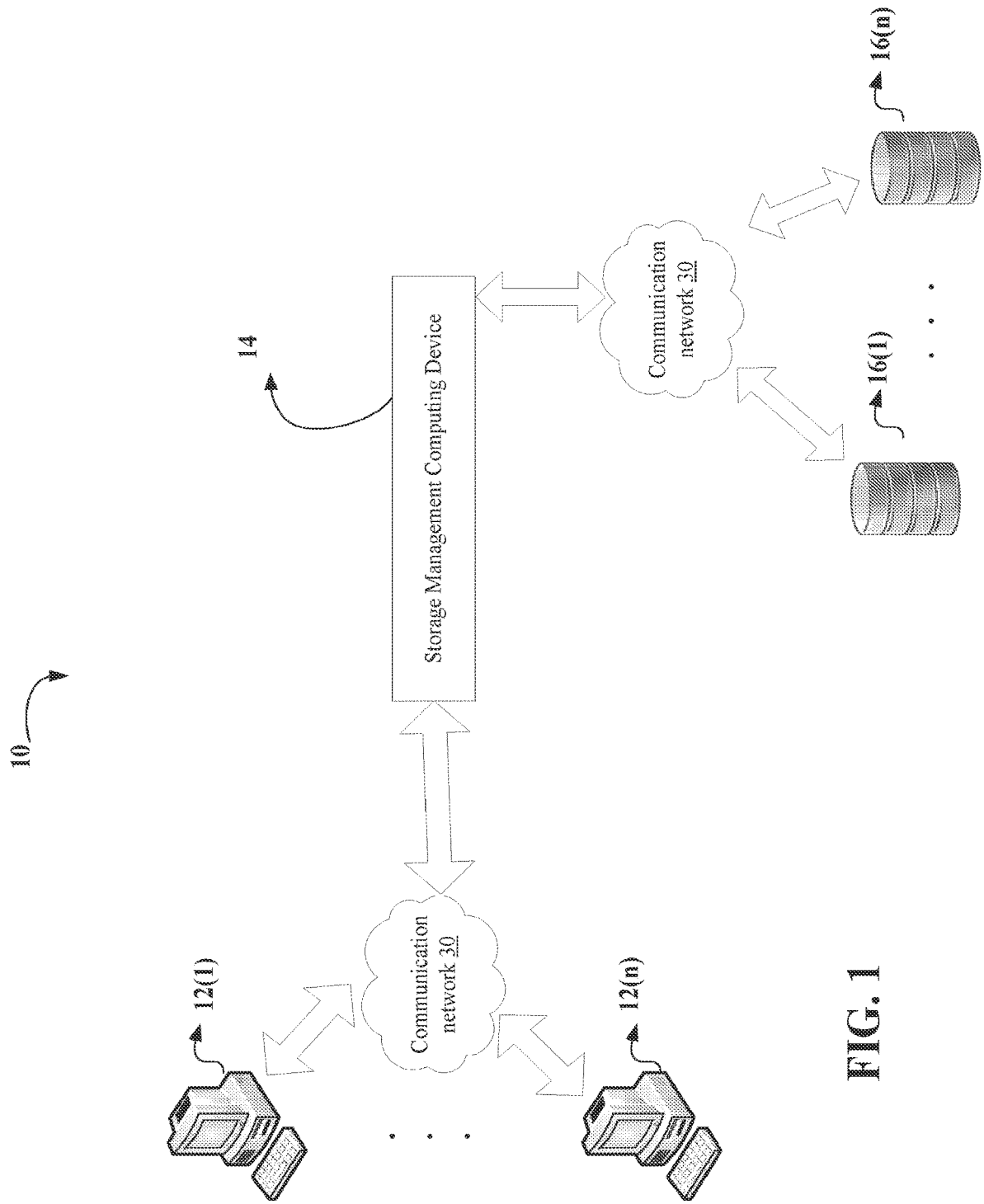
FIG. 1 is a block diagram of an environment with a storage management computing device that minimizes fragmentation in SSD within a storage system.

An environment 10 with a plurality of client computing devices 12(1)-12(n), an exemplary storage management computing device 14, a plurality of storage devices 16(1)-16(n) is illustrated in FIG. 1. In this particular example, the environment 10 in FIG. 1 includes the plurality of client computing devices 12(1)-12(n), the storage management computing device 14 and a plurality of storage devices 16(1)-16(n) coupled via one or more communication networks 30, although the environment could include other types and numbers of systems, devices, components, and/or other elements. The example of a method for minimizing fragmentation in SSD within a storage system is executed by the storage management computing device 14, although the approaches illustrated and described herein could be executed by other types and/or numbers of other computing systems and devices. The environment 10 may include other types and numbers of other network elements and devices, as is generally known in the art and will not be illustrated or described herein. This technology provides a number of advantages including providing methods, non-transitory computer readable media and devices for minimizing fragmentation in SSD within a storage system.

Figure 2:
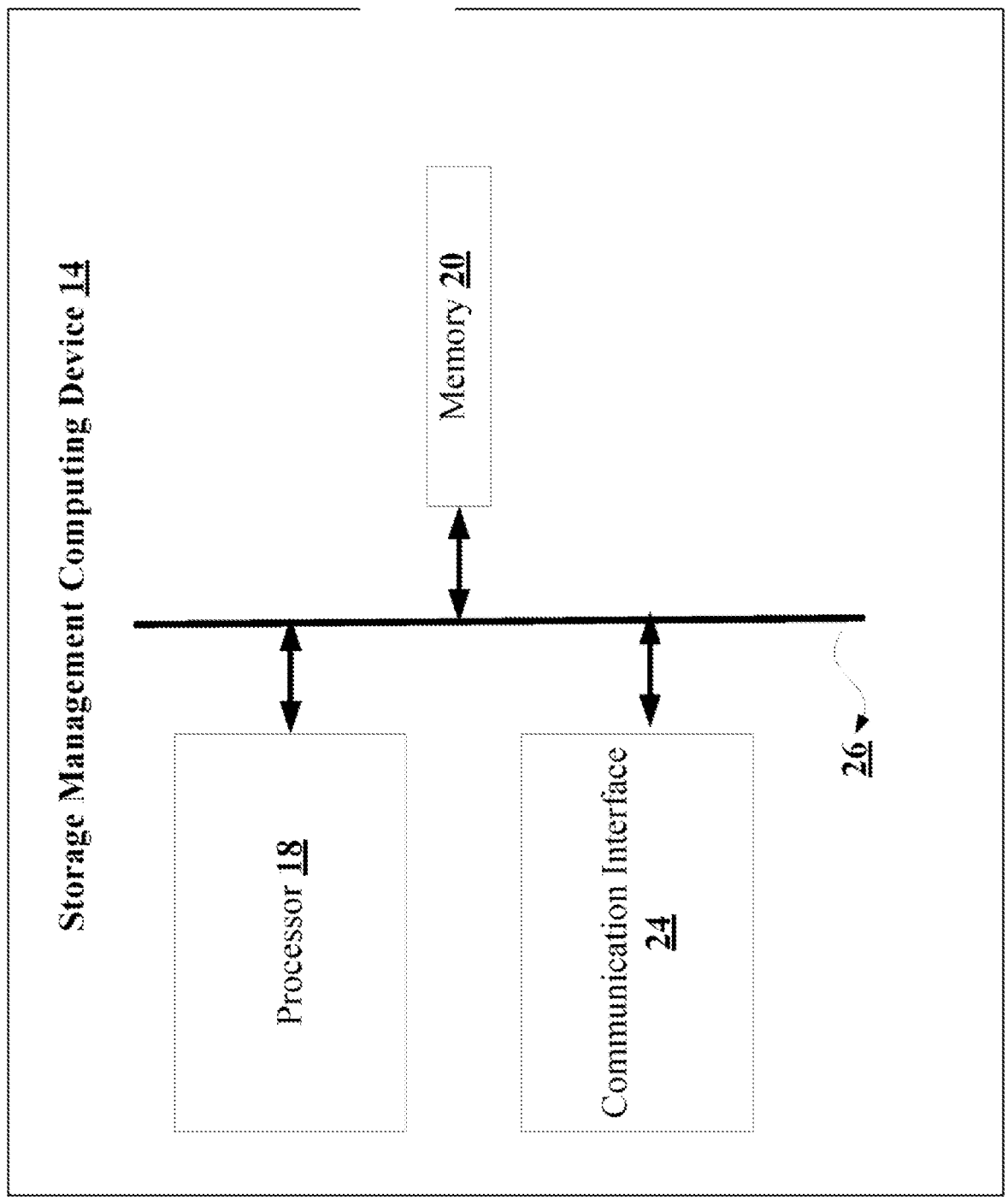
FIG. 2 is a block diagram of the exemplary storage management computing device shown in FIG. 1.

Referring to FIG. 2, in this example the storage management computing device 14 includes a processor 18, a memory 20, and a communication interface 24 which are coupled together by a bus 26, although the storage management computing device 14 may include other types and numbers of elements in other configurations.

The processor 18 of the storage management computing device 14 may execute one or more programmed instructions stored in the memory 20 for dynamic resource reservation based on classified input/output requests as illustrated and described in the examples herein, although other types and numbers of functions and/or other operation can be performed. The processor 18 of the storage management computing device 14 may include one or more central processing units ("CPUs") or general purpose processors with one or more processing cores, such as AMD® processor(s), although other types of processor(s) could be used (e.g., Intel®).

The memory 20 of the storage management computing device 14 stores the programmed instructions and other data for one or more aspects of the present technology as described and illustrated herein, although some or all of the programmed instructions could be stored and executed elsewhere. A variety of different types of memory storage devices, such as a non-volatile memory, random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The communication interface 24 of the storage management computing device 14 operatively couples and communicates with the plurality of client computing devices 12(1)-12(n) and the plurality of storage devices 16(1)-16(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hypertransport bus.

Each of the plurality of client computing devices 12(1)-12(n) includes a central processing unit (CPU) or processor, a memory, and an I/O system, which are coupled together by a bus or other link, although other numbers and types of network devices could be used. The plurality of client computing devices 12(1)-12(n) communicates with the storage management computing device 14 for storage management, although the client computing devices 12(1)-12(n) can interact with the storage management computing device 14 for other purposes. By way of example, the plurality of client computing devices 12(1)-12(n) may run application(s) that may provide an interface to make requests to access, modify, delete, edit, read or write data within storage management computing device 14 or the plurality of storage devices 16(1)-16(n) via the communication network 30.

Each of the plurality of storage devices 16(1)-16(n) includes a central processing unit (CPU) or processor, and an I/O system, which are coupled together by a bus or other link, although other numbers and types of network devices could be used. Each plurality of storage devices 16(1)-16(n) assists with storing data, although the plurality of storage devices 16(1)-16(n) can assist with other types of operations such as storing of files or data. Various network processing applications, such as CIFS applications, NFS applications, HTTP Web Data storage device applications, and/or FTP applications, may be operating on the plurality of storage devices 16(1)-16(n) and transmitting data (e.g., files or web pages) in response to requests from the storage management computing device 14 and the plurality of client computing devices 12(1)-12(n). It is to be understood that the plurality of storage devices 16(1)-16(n) may be hardware such as hard disk drives, solid state devices (SSD), or magnetic tapes, or software or may represent a system with multiple external resource servers, which may include internal or external networks. While in this example it is illustrated that the plurality of storage devices 16(1)-16(n) are outside the storage management computing device 14, the plurality of storage devices 16(1)-16(n) can reside within the storage management computing device 14 in other examples.

Although the exemplary network environment 10 includes the plurality of client computing devices 12(1)-12(n), the storage management computing device 14, and the plurality of storage devices 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
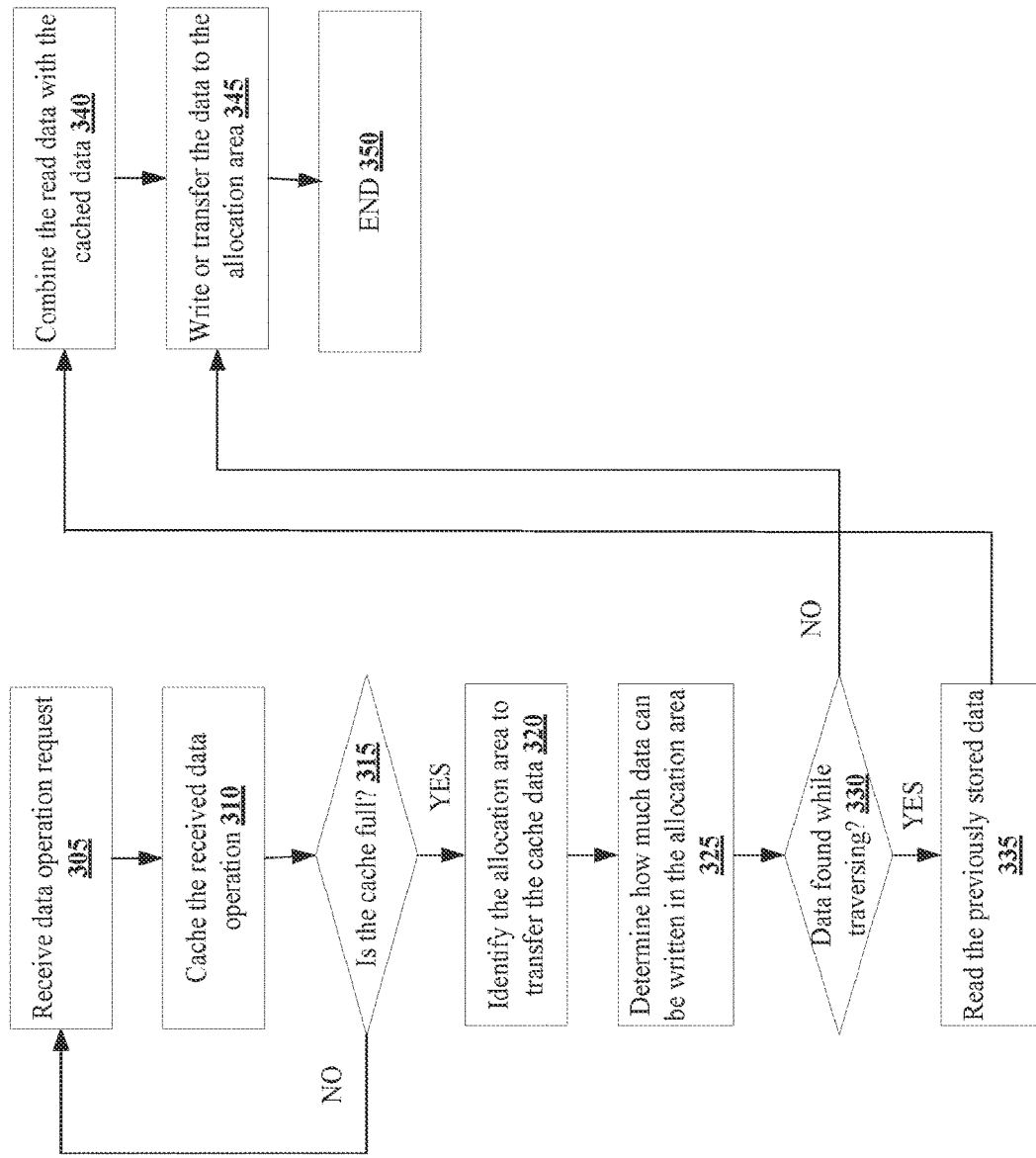
FIG. 3 is an exemplary flow chart of an example of a method for minimizing fragmentation in SSD within a storage system.

An example of a method for minimizing fragmentation in SSD within a storage system will now be described herein with reference to FIGS. 1-3. The exemplary method begins at step 305 where the storage management computing device 14 receives a data operation request, such as a read request or a write request by way of example, from one of the plurality of client computing devices 12(1)-12(n), although the storage management computing device 14 can receive other types and/or numbers of requests from other devices. In this particular example, the received data operation request includes a write request on an object, although the storage management computing device 14 can receive other types and/or numbers of data operation requests from other devices.

Next in step 310, the storage management computing device 14 caches the received write data operation into the cache within memory 20 of the storage management computing device 14, although the storage management computing device 14 can cache or otherwise store the operations at other memory locations.

Next in step 315, upon caching the received write data operation the storage management computing device 14 may determine when the cache within memory 20 has reached a threshold size. In this particular example, the cache within the memory 20 has a stored or otherwise set threshold size after which the cache cannot receive further data. Accordingly, when the storage management computing device 14 determines that the cache has not yet reached the threshold size, then the No branch is taken back to step 305 where the storage management computing device 14 continues to receive the data operation request from the plurality of client computing devices 12(1)-12(n).

However, if back in step 315 when the storage management computing device 14 determines that the cache is full, then the Yes branch is taken to step 320. In step 320, the storage management computing device 14 identifies an allocation area in one of the plurality of storage devices 16(1)-16(n) which is a solid state drive (SSD), although the storage management computing device 14 can identify the allocation area at other memory locations, such as in memory 20. In this example, allocation area relates to the memory space in the SSD where the contents from the cache could be transferred. Additionally in this example, the storage management computing device 14 includes metadata stored in the memory 20 that includes the address range in the memory strip within the SSD that can stage the data being flushed out of the cache within the memory 20. The storage management computing device 14 may use the metadata to identify the allocation area, although the storage management computing device 14 can use other types and/or amounts of information to identify the allocation area. Further in this example, the size allocation area identified by the storage management computing device 14 is at least equal to the size of the data in the cache that is going to be transferred, although the size of the allocation area can be more than the size of the data being transferred. Furthermore, the address range of the identified allocation area can include a combination of free space and previously stored data (due to fragmented data that was previously stored) in this example.

Next in step 325, the storage management computing device 14 determines or identifies the amount of data in the cache that can be transferred to the identified allocation area sequentially from the starting of the address range of the identified allocation area to the end of the address range of the identified allocation area.

In step 330, during the traversing the storage management computing device 14 determines when there is data stored in the address range of the identified allocation area, although the storage management computing device 14 can use other techniques to make the determination. In this example, the allocation area identified by the storage management computing device 14 can include data that was previously transferred from the cache within memory 20, although the identified allocation area can include other types and/or amounts of data. Accordingly, when the storage management computing device 14 determines that the data is present in the address range, then the Yes branch is taken in to step 335.

In step 335, the storage management computing device 14 reads the previously stored data in the address range of the allocation area. In this example, the storage management computing device 14 is required to read the previously stored data within the address range in the allocation area as the data has to be first read before writing the data back into the SSD.

Next in step 340, the storage management computing device 14 combines the read data from step 335 with the cache data that is required to be transferred to the allocation area, although the storage management computing device 14 can add other types and/or amounts of information.

Next in step 345, the storage management computing device 14 writes or transfers the data present in the cache within the memory 20 and the previously stored data that was read back into the identified allocation area within the SSD. Additionally back in step 330, when the storage management computing device 14 determines that there was no data found during the traversing, then the No branch is taken to this step 345. When the exemplary flow proceeds to step 345 with no data in the address range of the identified allocation area, then the storage management computing device 14 only writes or transfers the data from the cache within memory 20 to the identified allocation area. In this example, the storage management computing device 14 begins the write or transfers the data from the start of the address range of the identified allocation and proceeds to write or transfer the data sequentially in the address range. By writing the data into the allocation area sequentially, the technology is able to reduce the fragmentation in the SSD within the plurality of storage devices 16(1)-16(n) and the exemplary method ends at step 350.

Accordingly, as illustrated and described by way of the examples herein, this technology provides a number of advantages including providing methods, non-transitory computer readable media and devices for minimizing fragmentation in SSD within an enterprise storage system. By writing the data sequentially into the allocation area in the SSD, the technology able to significantly reduce the fragmentation in SSD thereby increases the memory utilization of the SSD.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for minimizing fragmentation in solid-state drives within a storage system, the method comprising:
   identifying, upon determining that a cache cannot accept any more data, an allocation area in a solid-state drive of a plurality of solid-state drives to which content of the cache can be transferred;
   determining a size for the allocation area that is equal to or great than a size of the content within the cache that is to be transferred;
   determining an address range in a memory strip of the solid-state drive for the allocation area; and
   initiating a sequential transfer of the content of the cache to a start of the address range in the allocation area.

2. The method of claim 1, comprising:
   storing a write data operation into the cache.

3. The method of claim 1, comprising:
   reading data from the allocation area at the address range.

4. The method of claim 3, wherein the data is read from the allocation area based upon the cache reaching a threshold size.

5. The method of claim 3, comprising:
   sequentially writing cached data from the cache and the data read from the allocation area back into the allocation area.

6. The method of claim 5, wherein the cached data and the data read from the allocation area are written sequentially beginning from the start of the address range in the allocation area.

7. The method of claim 5, comprising:
   writing the cached data to the allocation area sequentially based upon a determination that the allocation area lacks the data read from the allocation area.

8. A non-transitory machine readable medium comprising instructions for performing a method, which when executed by a machine, causes the machine to:
   in response to determining that a cache cannot accept any more data, identify an allocation area in a solid-state drive of a plurality of solid-state drives to which content of the cache can be transferred;
   determine a size for the allocation area that is equal to or great than a size of the content within the cache that is to be transferred;
   determine an address range in a memory strip of the solid-state drive for the allocation area; and
   initiate a sequential transfer of the content of the cache to a start of the address range in the allocation area.

9. The non-transitory machine readable medium of claim 8, wherein the instructions cause the machine to:
   read data from the allocation area at the address range.

10. The non-transitory machine readable medium of claim 9, wherein the data is read from the allocation area based upon the cache reaching a threshold size.

11. The non-transitory machine readable medium of claim 9, wherein the instructions cause the machine to:

sequentially write cached data from the cache and the data read from the allocation area back into the allocation area.

12. The non-transitory machine readable medium of claim 11, wherein the cached data and the data read from the allocation area are written sequentially beginning from the start of the address range in the allocation area.

13. The non-transitory machine readable medium of claim 11, wherein the instructions cause the machine to:
write the cached data to the allocation area sequentially based upon a determination that the allocation area lacks the data read from the allocation area.

14. The non-transitory machine readable medium of claim 8, wherein the instructions cause the machine to:
store a write data operation into the cache.

15. A computing device comprising:
a cache into which write data operations from client devices are cached;
a plurality of solid-state drives; and
a processor configured to execute instructions to cause the computing device to:
in response to determining that a cache cannot accept any more data, identify an allocation area in a solid-state drive of the plurality of solid-state drives to which content of the cache can be transferred;
determine a size for the allocation area that is equal to or great than a size of the content within the cache that is to be transferred;
determine an address range in a memory strip of the solid-state drive for the allocation area; and
initiate a sequential transfer of the content of the cache to a start of the address range in the allocation area.

16. The computing device of claim 15, wherein the instructions cause the computing device to:
read data from the allocation area at the address range.

17. The computing device of claim 16, wherein the data is read from the allocation area based upon the cache reaching a threshold size.

18. The computing device of claim 16, wherein the instructions cause the computing device to:
sequentially write cached data from the cache and the data read from the allocation area back into the allocation area.

19. The computing device of claim 18, wherein the cached data and the data read from the allocation area are written sequentially beginning from the start of the address range in the allocation area.

20. The computing device of claim 18, wherein the instructions cause the computing device to:
write the cached data to the allocation area sequentially based upon a determination that the allocation area lacks the data read from the allocation area.

* * * * *